United States Patent Office 3,705,088
Patented Dec. 5, 1972

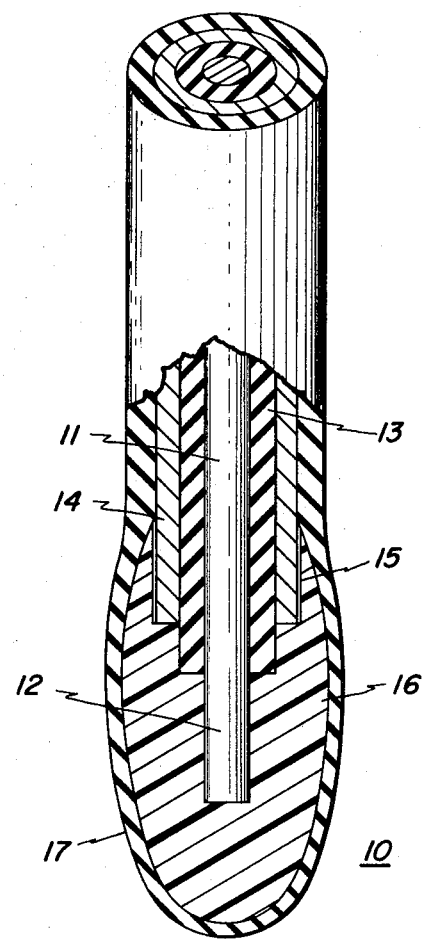

3,705,088
CARBON DIOXIDE SENSOR
Leonard W. Niedrach and Willard T. Grubb, Schenectady, N.Y., assignors to General Electric Company
Filed Oct. 16, 1970, Ser. No. 81,314
Int. Cl. G01n 27/46
U.S. Cl. 204—195 P                6 Claims

ABSTRACT OF THE DISCLOSURE

A carbon dioxide sensor has an elongated flexible current collector with an exterior surface of palladium on at least one end, an electrochemically active region of palladium oxide in electrical contact with a portion of the palladium surface of the current collector, a second elongated flexible current collector surrounding at least partially the first current collector, a second electrochemically active region of silver and silver halide in electrical contact with the second current collector, a first layer of electrical insulation disposed between the first and second current collectors, a second layer of electrical insulation disposed over the second current collector, an anion exchange resin electrolyte contacting both electrochemically active regions, and an outer sheath of carbon dioxide permeable, ion-impermeable diffusion barrier material encapsulating at least the electrochemically active regions and the electrolyte.

---

Reference is made to copending patent application entitled "Sensor and Method of Manufacture" filed Sept. 4, 1970, and given Ser. No. 69,650 which describes and claims a sensor including an ion exchange resin electrolyte and methods of manufacture. This copending application, in the name of Leonard W. Niedrach, is assigned to the same assignee as the present application.

Reference is made to copending patent application entitled "Hydrogen Ion Selective Sensor and Electrode Therefor" filed Sept. 30, 1970, and given Ser. No. 76,794, which describes and claims a sensor and an electrode therefor which electrode has a palladium oxide coated palladium surface. This copending application in the names of Willard T. Grubb and Lawrence H. King, is assigned to the same assignee as the present application.

This invention relates to carbon dioxide sensors and, more particularly, to carbon dioxide sensors employing as one of the sensing elements an electrochemically active region of palladium oxide.

Carbon dioxide sensors are known in the prior art for determining carbon dioxide content of a sample. Such a sensor has a pH sensitive electrode, an electrolyte whose pH is sensitive to the partial pressure of carbon dioxide in equilibrium with it, a counter-reference electrode insensitive to changes in pH or bicarbonate concentration, and a diffusion barrier that is permeable to carbon dioxide but isolates the electrochemical sensing elements from the system to be monitored. In operation, the terminal voltage is a definite function of the partial pressure of the carbon dioxide in equilibrium with it.

Our present invention is directed to an improved carbon dioxide sensor which is suitable for biomedical, environmental control and other applications.

The primary objects of our invention are to provide a rugged, dependable and miniaturized carbon dioxide sensor.

In accordance with one aspect of our invention, a carbon dioxide sensor comprises a first elongated flexible current collector with an exterior surface of palladium on at least one end, an electrochemically active region of palladium oxide in electrical contact with a portion of the palladium surface of the current collector, a second elongated flexible current collector surrounding at least partially the first current collector, a second electrochemically active region of silver and silver halide in electrical contact with the second current collector, a first layer of eelctrical insulation disposed between said first and second current collectors, a second layer of electrical insulation disposed over the second current collector, an anion exchange resin electrolyte contacting both electrochemically active regions, and an outer sheath of carbon dioxide-permeable, ion-permeable diffusion barrier material encapsulating the electrochemically active regions and the electrolyte.

These and various other objects, features and advantages of the invention will be better understood from the following description taken in connection with the accompanying drawing in which:

The single figure is a sectional view of a portion of a carbon dioxide sensor made in accordance with our invention.

In the single figure of the drawing, there is shown generally at 10 a portion of a carbon dioxide sensor embodying our invention. Sensor 10 is shown with a first elongated flexible current collector 11 in the form of a 30 mil palladium wire with an electrochemically active region 12 of palladium oxide in electrical contact with the lower end portion thereof. This electrochemically active region 12 provides the sensing electrode. A first layer of electrical insulation 13 in the form of Alkanex polyester resin lacquer surrounds current collector 11 but region 12 is exposed. The first layer of insulation could be in a variety of forms including shrunken heat-shrinkable tubing or lacquer applied from solution. A second elongated current collector 14 of silver paint surrounds at least partially the first current collector 11 whereby electrical insulation 13 is disposed between current collectors 11 and 14. Current collector 14 can be in a variety of configurations including a stripe, wire, etc. Such current collectors surround at least partially the first current collector. A second electrochemically active region 15 consists of silver and a silver halide on the lower portion of silver current collector 14. This electrochemically active region 15 provides the reference electrode.

An anion exchange resin electrolyte 16 of quaternized polystyrene partially in its bicarbonate form and partially in its chloride form contacts both electrochemically active regions 12 and 15, respectively, by bridging first polymer electrical insulation 13. A carbon dioxide diffusion barrier material 17 is disposed over second current collector 14 as a layer of electrical insulation and encapsulates as an outer sheath the electrochemically active regions 12 and 15, and electrolyte 16. If desired, a separate layer of electrical insulation can surround current collector 14. The resulting device is a potentiometric carbon dioxide sensor.

We found that we could form the above improved carbon dioxide sensor by a method of applying successive elements from various solutions after which each solution solvent was evaporated. The application of the successive layers is preferably accomplished by immersion steps but other suitable means include coating, spraying, brushing, etc. The use of immersion steps is described and claimed in the above referenced copending application Ser. No. 69,650.

The carbon dioxide sensor of our invention can be formed by employing for the initial support wire forming the current collector a palladium wire. Other base materials with a palladium surface deposited on at least one end thereof can also be employed. The first electrochemically active region which is employed for the sensing electrode is palladium oxide. The second electrochemically active region which can be employed for the reference electrode is silver and a silver halide except a fluoride.

Various electrical insulating materials are useable and many of such materials can be applied by coating steps. Preferred materials include Viton hexafluoropropylene-vinylidene fluoride rubber, Alkanex polyester resin lacquer, silicone rubbers, and polypropylene oxides. We prefer to employ Alkanex lacquer which provides the desired electrical insulation and which can be applied by coating or dipping. The Alkanex polyester resin lacquer can be cross-linked by heating to insolubilize and thereby facilitate the application of successive layers. We found that various carbon dioxide diffusion barrier materials are suitable as an outer sheath to encapsulate at least the electrochemically active regions and the electrolyte. The carbon dioxide permeable, ion-impermeable diffusion barrier material must be electrically insulating and have an appropriate permeability coefficient for the carbon dioxide to be sensed. Since these materials are electrically insulating, the carbon dioxide diffusion barrier sheath and the second layer of insulation can be made of one of these materials. Thus, the separate second layer of electrical insulation can be eliminated. Suitable materials which have been employed include silicone-polycarbonate copolymers, Viton hexafluoropropylene-vinylidene fluoride rubber and silicone rubbers.

An anion exchange resin can be employed as the electrolyte in our sensor and can be applied by coating. Various exchange membrane materials are known. For example, reference is made to such preparation and properties of a number of different types of such resins in U.S. Pat. No. 3,134,697 entitled "Fuel Cell" which issued in the name of Leonard W. Niedrach and is assigned to the same assignee as the present application. With this anion exchange resin type carbon dioxide sensor, we found that suitable electrolytes included a terpolymer of methyl methacrylate, divinylbenzene and 2-hydroxy-3-trimethylammonium propyl methacrylate partially in the bicarbonate form and partially in the chloride form, and quaternized polystyrene partially in the bicarbonate form and partially in the chloride form.

A quaternized polystyrene is a polystyrene which is partially converted to a quaternary amine derivative. The manufacture of this electrolyte involves the chloromethylation and subsequent quaternization of polystyrene as shown in Equation 1.

Equation 1

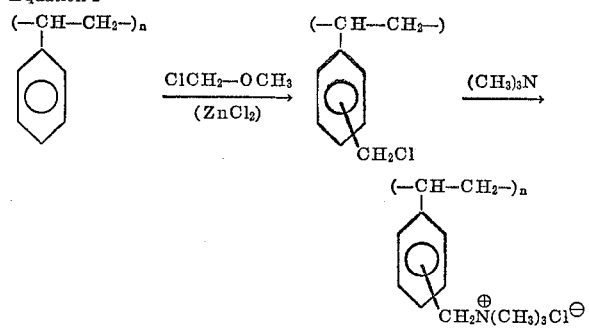

Both reaction steps are known and appear in the literature; however, whereas the known processes generally strive for a high content of ionic groups in the polymer, it is critical for the present application that a certain relatively low level of ammonium groups be present in the polymer, the fairly narrow limits of substitution being prescribed by insufficient conductivity on the one hand and excessive swelling in water on the other. The following reproducible procedure describes attaining the desired level of chloromethylation of the polymer and the conversion of the intermediate into the quaternized polyelectrolyte.

The chloromethylation of polystyrene is carried out to obtain optimal values which correspond to chlorine contents of 3.6-4.2% for the chloromethylated but not quaternized resin, about 1 chloromethyl group for every 8 repeat units. Polystyrene is generally chloromethylated in chloromethylmethylether as the alkylating agent with zinc chloride as a catalyst, without use of a solvent or diluent. This procedure leads to a rapid reaction and high levels of substitution. This method does not lend itself well to the synthesis of the product required for the present application.

The procedure adopted for the synthesis of a product containing the desired level of chloromethyl substitution requires a 15-fold excess over the stoichiometrically required amount of chloromethylmethylether. Methylene chloride is used as an inert solvent and diluent and anhydrous zinc chloride is added as a catalyst. No cross-linking is observed under these conditions and the reaction time of around 3 hours is sufficiently long that the time elapsed between monitoring the progress of the reaction and quenching has little effect on the product.

After the reaction mixture has attained the desired viscosity, the reaction is quenched by adding a specified amount of 20% water in dioxane and the product is then isolated by adding the reaction mixture with stirring to methanol. The white, fibrous precipitate is collected, air-dried and redissolved in dioxane. A second precipitation step with water as the precipitant is carried out in the same manner; in this way, the complete removal of zinc salts is assured.

The quaternization of chloromethyl polystyrene is accomplished by the reaction of chloromethyl polystyrene with trimethylamine according to Equation 2.

Equation II

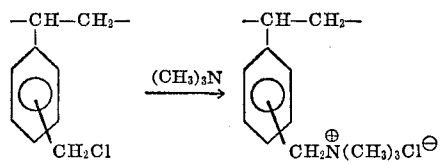

The nature of the tertiary amine is presumably not critical for the performance of the resin. Trimethylamine was chosen because the ease of quaternization is inversely proportional to the size of the amine. Complete conversion to a quaternary resin can readily be achieved by treatment of the chloromethyl polystyrene in dioxane solution with excess trimethylamine at room temperature for 24 hours. Trimethylamine is conveniently applied as a 20% solution in dioxane. The product precipitates from solution before the quaternization is complete. Addition of methanol will bring the polymer back into solution so that the reaction can go to completion. The final product is then recovered by adding the reaction mixture to stirred diethylether or petroleum ether. The product precipitates in the form of a viscous, sticky white gum which hardens gradually upon prolonged stirring with the precipitant as the methanol is being extracted from the resin. The material is broken up mechanically and dried at 40–50° C. in vacuo.

Our carbon dioxide sensor can be formed by applying successive elements from various organic solutions after which each solution solvent was evaporated. The application of the successive layers is preferably accomplished by a series of immersion or application coating steps.

With reference to the single figure of the drawing a carbon dioxide sensor is formed in accordance with our invention by employing a 30 mil palladium wire 11 as the base or support upon which the successive elements are applied. This wire is the first elongated flexible current collector 11 of the sensor.

A first electrochemically active region 12 is placed in electrical contact with current collector 11 by applying a layer of palladium oxide on one end portion of the current collector. The palladium oxide active region is prepared by employing the high temperature reaction of palladium with oxygen from the air in the presence of an alkali metal hydroxide as set forth in the above referenced copending patent application Ser. No. 76,794. The parameters of preparing such an oxide active region were investigated as to the choice of time and temperature of the reaction, the choice of the alkali metal hydroxide and its concentration, precleaning and roughening of the palladium current collector and the use of electrical insulation on the portion of the current collector. Treatment of the palladium surface of the current collector at a temperature of 800° C. appeared to be the optimal temperature. However, palladium oxide can be formed on such a current collector as low as 350° C. and up to about 938° C. where the oxide decomposes. Of the alkali metal hydroxides tested, sodium hydroxide gave the best electrode with potassium hydroxide providing good electrodes. We found that lithium hydroxide did not appear to work. In the process, precleaning and roughening of the exterior palladium surface of the current collector was found to be required for best results. Such precleaning and roughening was accomplished by dipping in aqua regia for about 30 seconds or sand blasting or a combination of both. The heating period at 800° C. was varied from about 25 seconds to 120 minutes. Within this time period the optimal time was 10–20 minutes. When electrical insulation was applied on a portion of the exterior palladium surface of the current collector after oxidation of the other portion of the surface of the current collector to a palladium oxide surface the results were more reproducible.

A preferred method of forming a hydrogen ion-selective electrode made in accordance with our invention was to employ a current collector of palladium which was dipped at one end into the aqua regia for 30 seconds to etch and preclean the surface. The cleaned end was rinsed and then dipped into a 50 weight percent solution of sodium hydroxide. The same end of the current collector was then placed for 20 minutes in the hot zone of a furnace controlled at 800° C. The palladium current collector with a black palladium oxide coating portion adhering tightly to the one end of the palladium current collector was removed from the furnace, rinsed in flowing distilled water and stored in distilled water or a neutral buffer solution. Subsequently, the current collector with active region of palladium oxide in contact with one end thereof was rinsed and dried. A layer of electrical insulation of Alkanex polyester resin lacquer was applied from the upper end of the palladium oxide coating to near the opposite end of the current collector. After drying, the Alkanex polyester resin lacquer was cured. A segment of uninsulated current collector was provided at the opposite end to provide for a connection of an electrical lead subsequently thereto.

A second elongated flexible current collector 14 of silver or gold is applied to the first layer of insulation to surround the first current collector 11 by painting or plating the silver or gold thereon. Second active region 15 at one end of the collector is prepared by forming silver chloride which is applied on the silver surface of the current collector by a chloriding step such as anodizing in a dilute solution of a chloride. If gold is employed as the second current collector 14, silver is deposited electrochemically and then silver chloride is formed into the surface. A second layer of electrical insulation can be applied over second current collector 14 except for a small region at the upper end for subsequently applying an electrical lead thereto. However, we prefer to employ the subsequently applied carbon dioxide diffusion barrier in this manner thereby eliminating the need for a separate electrically insulating coating on collector 14. The lower end of the structure with electrochemically active regions 12 and 15 is immersed in a solution of quaternized polystyrene in the initial chloride form thereby forming ion exchange resin electrolyte 16. Electrolyte 16 is in contact with both regions 12 and 15.

Electrolyte 16 is converted partially to a bicarbonate form and partially to a chloride form. This is accomplished by immersing the sensor in an aqueous KCl-KHCO$_3$ solution whereby the electrolyte is converted to a mixed bicarbonate-chloride form of resin. The device is then rinsed briefly in water and dried in a flowing nitrogen gas for about 1 minute at 50° C. A diffusion barrier of a silicone-polycarbonate rubber is then applied as an outer sheath 17 encapsulating the electrically active regions 12 and 15, electrolyte 12, and second current collector 14.

The resulting carbon dioxide sensor can be used for clinical or other analysis. A voltmeter is connected to the respective electrodes. The terminal voltage from the sensor in operation will be a function of the carbon dioxide partial pressure in equilibrium with it.

Examples of carbon dioxide sensors made in accordance with our invention are as follows:

EXAMPLE 1

A carbon dioxide sensor was formed in accordance with the above description and as generally shown in the single figure of the drawing. The current collector was in the form of a 30 mil palladium wire, one end of which had been coated with palladium oxide. This was accomplished by dipping that end of the wire in 50 weight percent sodium hydroxide in water, heating the wire to 800° C. in air for 20 minutes, cooling the wire, rinsing it in distilled water, and drying in air before applying insulation.

The remainder of the current collector, with the exception of about 1 centimeter at the opposite end, was coated with Alkanex polyester resin lacquer. This was accomplished by immersing in a solution of Alkanex polyester resin lacquer. The coated wire was heated at a temperature of 100° C. to evaporate the solvent and then to 200° C. to crosslink the coating. This coating step was repeated several times. The second current collector was silver which was applied as a lacquer over the first insulation. The lacquer employed Alkanex polyester resin lacquer as the binder for silver flake. Application was accomplished as above for the first insulation. Only one coat was applied. A 0.5 cm. wide band at the end of the silver coating adjacent to the palladium oxide was chlorided anodically at a current of 0.5 milliamperes using 0.1 N HCl bath with a platinum electrode serving as the counter electrode. The sequence of the chloriding was 2 minutes anodic, 2 minutes cathodic and 10 minutes anodic.

After the second electrochemically active region had been formed, the lower end of the structure had applied thereon an ion exchange resin electrolyte consisting of a quaternized polystyrene in the chloride form having an ion exchange capacity of about 1.4 milli-equivalents per gram. The electrolyte layer was applied by immersing the lower end of the structure in a solution of the resin in a mixture of chloroform-methanol to contact both electrochemically active regions. The structure was then heated in nitrogen at 50° C. for 10 minutes to eliminate any residual solvents.

The electrolyte was converted to a partially bicarbonate form and partially chloride form by immersing the structure in an aqueous 0.1 M KCl-0.1 M KHCO$_3$ solution for about an hour. The structure was then rinsed briefly in water and dried for about 1 minute in flowing nitrogen gas at 50° C.

A second layer of electrical insulation was then applied over the second current collector by immersing the structure in a solution of silicone-polycarbonate resin in chloroform. The chloroform was removed by heating for 5 to 10 minutes in a nitrogen atmosphere at 50° C. The resulting polymer film is both a diffusion barrier and has electrical insulating properties. Thus, in addition to an insulating layer being formed over the second current collector a carbon dioxide diffusion barrier also encapsulated both of the electrically active regions and the electrolyte. The resulting structure was a carbon dioxide sensor.

EXAMPLE 2

A carbon dioxide sensor was formed generally in accordance with Example 1 above. However, the first insulation was in the form of a layer of shrunken heat-shrinkable polyolefin tubing. The second current collector was applied in the form of a silver wire in spiral fashion around the first insulation. The second electrochemically active region was in the form of a closer spiral of the same wire which was chlorided by anodization as in Example 1 above.

After the second electrochemically active region had been formed, the lower end of the structure had applied thereon an ion exchange resin electrolyte consisting of a terpolymer of methyl methacrylate, divinylbenzene, and 2-hydroxy-3-trimethylammonium, propyl methacrylate in the chloride form having an ion exchange capacity of about 0.7 milli-equivalent per gram. The electrolyte layer was applied by immersing the lower end of the structure in a solution of the resin in a mixture of chloroform-methanol to contact both electrochemically active regions. The structure was then heated in nitrogen at 50° C. for 10 minutes to eliminate any residual solvents.

The electrolyte was subsequently converted to the partially bicarbonate and partially chloride form and coated with the second layer of electrical insulation and the diffusion barrier material of silicone-polycarbonate resin as in Example 1 above. The resulting structure was a carbon dioxide sensor.

EXAMPLE 3

A carbon dioxide sensor was formed generally in accordance with Example 1 above. However, the second current collector was gold which was applied by painting onto the first insulation. After application of the gold paint, silver was deposited electrochemically as a 5 millimeter wide region at the lower end of the current collector. The silver depositing was accomplished by employing a commercial cyanide bath which used a silver wire anode at 1 milliampere for one thousand seconds. After the end of the structure had been rinsed in water, the surface of the silver was chlorided anodically at a current of 0.5 milliampere using a 0.1 N HCl bath with a platinum electrode serving as the counter electrode. The sequence of the chloriding was 2 minutes anodic, 2 minutes cathodic and 10 minutes anodic.

The electrolyte was the terpolymer employed in Example 2. It was, however, maintained in the chloride form when the second layer of electrical insulation and the diffusion barrier of methyl-phenyl siloxane was applied from a chloroform solution using procedures generally in accordance with Example 1 above. The resulting structure was a carbon dioxide sensor.

EXAMPLE 4

A carbon dioxide sensor was formed generally in accordance with Example 1 above. However, the electrolyte of quaternized polystyrene having ion exchange capacity of about 1.4 milli-equivalents per gram was converted to the mixed bicarbonate-chloride form by immersion in a 0.075 M NaCl-0.075 M NaHCO$_3$ solution. The resulting structure, which had a second insulation and diffusion barrier of silicone-polycarbonate resin, was a carbon dioxide sensor.

EXAMPLE 5

The above four sensors formed in Examples 1–4 were tested by measuring their terminal voltage with a high impedance millivoltmeter while immersed under water or a 0.15 M NaCl solution at 37° C. and in equilibrium with gases containing various amounts of carbon dioxide from 1 to 10% in air. For an ideal sensor having a bicarbonate containing electrolyte, the anticipated voltage change at 37° C. is 61 millivolts per ten-fold change in carbon dioxide partial pressure. In the absence of the bicarbonate in the sensor's electrolyte, a response of only 30.5 millivolts per ten-fold change in carbon dioxide partial pressure is anticipated. The performance of the four above mentioned sensors is set forth below in Table I:

TABLE I

| Sensor number | | Response, mv./decade PCO$^2$ | |
|---|---|---|---|
| | | Actual | Theoretical |
| 1 | Example 1 | 55 | 61 |
| 2 | Example 2 | 55 | 61 |
| 3 | Example 3 | 29 | 30.5 |
| 4 | Example 4 | 56 | 61 |

While other modifications of the invention and variations thereof which may be employed within the scope of this invention have not been described, the invention is intended to include such as may be embraced within the following claims.

What we claim as new and desire to secure by Letters Patent of the United States is:

1. A carbon dioxide sensor comprising a first elongated flexible current collector with an exterior surface of palladium on at least one end, an electrochemically active region of palladium oxide in electrical contact with a portion of the palladium surface of the current collector, a second elongated flexible current collector surrounding at least partially the first current collector, a second electrochemically active region of silver and silver halide in electrical contact with the second current collector, a first layer of electrical insulation disposed between the first and second current collectors, a second layer of electrical insulation disposed over the second current collector, an anion exchange resin electrolyte contacting both electrochemically active regions, and an outer sheath of carbon dioxide permeable, ion-impermeable diffusion barrier material encapsulating at least the electrochemically active regions and the electrolyte.

2. A carbon dioxide sensor as in claim 1, in which the second current collector is silver paint.

3. A carbon dioxide sensor as in claim 1, in which the silver halide is silver chloride.

4. A carbon dioxide sensor as in claim 1, in which the second electrochemically active region is in the form of a silver chloride-coated silver wire spiral.

5. A carbon dioxide sensor as in claim 1, in which the first current collector is a palladium wire, the first electrochemically active region is palladium oxide, the second current collector is silver, the second electrochemically active region is silver and silver chloride, the electrolyte is quaternized polystyrene partially in its bicarbonate form and partially in its chloride form, the first insulation is a polyester resin lacquer, and the second insulation and diffusion barrier are a silicone-polycarbonate polymer.

6. A carbon dioxide sensor as in claim 1, in which the first current collector is a palladium wire, the first electrochemically active region is palladium oxide, the second current collector is silver, the second electrochemically active region is silver and silver chloride, the electrolyte is a terpolymer of methyl methacrylate, divinylbenzene and 2-hydroxy 3-trimethylammonium propyl methacrylate partially in its bicarbonate form and partially in its chloride form, the first insulation is a polyester resin lacquer, and the second insulation and diffusion barrier are silicone polycarbonate polymer.

References Cited
UNITED STATES PATENTS

| | | | |
|---|---|---|---|
| 3,098,813 | 7/1963 | Beebe et al. | 204—195 |
| 3,134,697 | 5/1964 | Niedrach | 136—86 F |
| 3,278,408 | 10/1966 | Leonard et al. | 204—195 |
| 3,382,105 | 5/1968 | McBryar et al. | 136—86 F |
| 3,415,730 | 12/1968 | Haddad | 204—195 |
| 3,539,455 | 11/1970 | Clark | 204—1 T |

TA-HSUNG TUNG, Primary Examiner